United States Patent Office 3,007,893
Patented Nov. 7, 1961

3,007,893
SAND CORE COMPOSITION COMPRISING SAND AND SALT OF ACRYLIC ACID-ACRYLONITRILE COPOLYMER
John A. Te Pas, Avon Lake, Ohio, assignor to The B. F. Goodrich Company, New York, N.Y., a corporation of New York
No Drawing. Filed Apr. 9, 1959, Ser. No. 805,145
9 Claims. (Cl. 260—41)

This invention relates to sand core and mold compositions and more particularly pertains to mixtures of sand and acrylonitrile-acrylic acid copolymers and to the green and baked cores and molds resulting from said mixtures.

Synthetic water-soluble polymers have been used in the past as binders for sand in the production of cores and molds suitable for use in the casting of metal. The polymers of the prior art which have been used in the sand core and mold application have been described as giving excellent baked tensile, good bakeability, good permeability to gases generated during the baking operation, good blendability or the ability to mix well and deposit well upon blowing, and good collapsibility or ability to yield when the cast metal cools and shrinks. Many of the polymers of the prior art having the above-mentioned properties are deficient in one or more of the essential properties, namely, good green strength, plasticity, and non-stickiness of the unbaked cores and molds and good water insensitivity of the baked cores and molds.

In the past it has been possible to select a synthetic water-soluble binder-sand composition which was particularly good in one or several of the foregoing physical properties essential in a good sand core or mold, however, no single synthetic water-soluble polymer could produce a completely good balance of the aforementioned essential properties. Polymers used in sand cores having good plasticity and green strength might produce baked cores having extreme water-sensitivity, for example.

Accordingly, an object of the present invention is the provision of novel sand-synthetic polymer mixes useful for preparing sand cores and molds for the casting of metals. Another object of this invention is the provision of new sand cores and molds useful in the casting of metals, said cores and molds having evenly balanced physical properties in both the green and baked states. Still another object is the provision of a method for preparing said sand-synthetic polymer mixes and said sand cores and molds. These and other objects of the present invention will become apparent to those skilled in the art from the following description and examples.

I have discovered a sand core and mold composition suitable for casting of metals and having well balanced physical properties comprising a mixture of from 97 to 99.85% sand and from 0.15 to 3% of a synthetic water-soluble polymer, said synthetic water-soluble polymer comprising the ammonium, amine or amino alkanol salt of an interpolymer of from 60 to 80% by weight of acrylonitrile and from 20 to 40% by weight of acrylic acid.

The acrylonitrile-acrylic acid copolymers useful as binders in the compositions of this invention are prepared in emulsion, solution or bulk polymerization systems with free-radical initiators. The preferred method for preparing the acrylonitrile-acrylic acid copolymers embodied in this invention is by an emulsion or suspension polymerization in water with a free-radical initiator, such as potassium persulfate. The resulting polymers are then neutralized to a pH of from about 6 to about 9 with ammonia, a primary, secondary or tertiary water-soluble alkyl amine, such as methyl amine, dimethyl amine, trimethyl amine, triethyl amine and the like, or an amino alkanol such as monoethanol amine, diethanol amine, triethanol amine, monopropanol amine and the like and others. Ammonia and the amino alkanols are preferred for the purposes of this invention. In general low viscosity neutralized solutions of an acrylic acid-acrylonitrile polymer are most conveniently obtained by using an amino alkanol as neutralizing agent.

The sand core and mold compositions embodied in this invention without further additives, except moisture and optionally a small amount of lubricant, such as kerosene, produce cores and molds of exceptionally high green strength, baked strength, hardness, collapsibility, gas permeability, blowability, plasticity, water insensitivity and unusual non-sticking properties. Cores and molds made from such a composition are useful in the casting of iron, steel, cast iron, grey iron, malleable iron, copper, bronze, aluminum, magnesium and other metals and alloys. The sand core composition is also useful in the so-called shell-molding process wherein the sand composition is blown, rammed or shaken into place on a metal pattern or mold and allowed to stand until a thin layer thereof has hardened on the pattern after which the excess is removed leaving a hollow core or mold of sufficient strength when further baked and suitably supported, to receive the molten metal.

Any sand may be utilized in the sand core and mold compositions of the present invention. It is generally preferred to use a clean, washed round- or sub-angular grained silica base sand of the general type known as foundry sand. Such sand is available in a wide range of particle sizes containing particles ranging from about 30 to about 270 mesh or finer U.S. series. Such sands usually contain a range of particle sizes and are given a fineness number based on their particle size distribution which is designated as "AFS Fineness No. ———." In general the coarser the particle size of the sand the higher will be the baked strength, baked permeability, baked indentation or "scratch" hardness, and blowability, while, with the binder of this invention, increased sand fineness appears to form high green strength and better collapsibility. In addition to naturally occurring foundry sand it is sometimes advantageous for special purposes to utilize artificially prepared siliceous materials, such as silica flour and other special additives, such as wood flour, sawdust, fire clays, bentonites, straw, hay and other fillers, boric acid, iron oxide, sulfuric acid and others.

The amount of the acrylonitrile-acrylic acid polymer salt to be utilized as a binder may be varied considerably. As little as 0.15%, based on the weight of dry sand, produces satisfactory core or mold mixes for some purposes, while in others amounts as large as 3% or more may be utilized. In general, from 0.2 to 1.5% will be found satisfactory for most purposes with 0.25 to 1.0% being particularly preferred.

In addition to the sand and the ammonium, amine or alkanol amine salt of the acrylonitrile-acrylic acid copolymer the only other ingredient required in the sand mix of this invention is water. In general, moisture is required to impart moldability to the mix and for the development of satisfactory green strength. With the bonding agents of this invention as the amount of total moisture is increased the moldability and green strength are rapidly increased. Satisfactory green strength, moldability and surface finish are obtained in the range of 1.0% to 6% or more total moisture in the mix. The baked properties, however, of the sand mix of this invention are practically constant over a range of 2 to 6% moisture when using up to 1.5% binder. Since too high total moisture content unduly lengthens the baking cycle, it is particularly preferred to maintain the total moisture content of the mix in the range of 2.5 to 5.0%.

In the practice of this invention, the dry sand and the acrylic polymer bonding agent may be mixed in any conventional manner. The dry acrylonitrile-acrylic acid polymer in finely divided form may be mixed with dry sand to form a composition to which only the correct amount of water and neutralizing agent need be added before use. Such a dry mixture may be stored almost indefinitely without deleterious effects, since the polymer itself is very stable. The acrylonitrile-acrylic acid copolymers and their ammonium and amine salts of the aforementioned types are highly water-soluble and are usually supplied as water solutions containing from 10 to about 35% by weight of polymer; hence it is usually preferred to mix the dry sand with a neutralized, aqueous solution of the bonding agent. Moreover, since these polymer solutions may be diluted almost indefinitely without precipitation, the binder-solution may be diluted to the correct strength to yield directly, on admixture with sand, a core or mold mix of proper total moisture content.

Intermixture of the sand and neutralized, acrylonitrile-acrylic acid copolymer may be performed by hand, in an internal mixer, or a paddle type mixer or in any of the low and high speed mulling machines conventionally utilized in preparing such compositions. No particular care as to order of mixing or of time and temperature of mixing need be exercised since the binding agent of this invention is exceptionally stable. The intermixture of the ingredients of the sand core and mold compositions of this invention may be accomplished by adding the ingredients one at a time, or in any order, or all at once, without effect on core or mold properties with the latter procedure being preferred because of speed and economy. An efficient internal mixer or mulling machine produces a homogeneous composition of this invention in a very short time, usually from 1 to 2 or up to 5 minutes or less. The resulting green core or mold mix may be stored indefinitely without development of rancidity and may suffer substantial dehydration without loss of green or baked properties, since the binder of this invention is not sensitive to variations in moisture content. Any moisture lost during such storage of the mix can be easily replaced before use, if desired.

The resulting sand mix is then shaped by ramming, jolting, blowing or any combination thereof into a suitable core or mold box, or on a pattern or other shaping device or by shaking or blowing into a hot mold. Cores or difficult or intricate shape may be made in halves and pasted together with a solution of the binder or any other adhesive. When compacted or shaped in such a manner the core or mold is easily removed from the shaping device and is found to be hard and of such high green strength that it is easily handled in subsequent operations and is especially adapted to use as a green or unbaked core.

The operation in which the green core is converted to a hard, dry condition is essentially a dehydration operation. The core may be dried at room temperature and will be found to possess properties in every case as good and in many cases slightly superior to the properties of a similar core baked at elevated temperatures (as is more conventional in foundry practice) or to cores prepared with the same or much larger proportions of other bonding agents.

Since air drying is undesirably slow, drying or baking of the core may be carried out in an air oven or by dielectric heat, the latter being especially preferred for the reason that the use of dielectric heat eliminates the chances of over-baking. Air oven drying is satisfactorily accomplished in from 5 to 60 minutes at temperatures of 100 to 450° F. or more and preferably in 10 to 30 minutes at 200 to 300° F.

After the molten metal has been poured in and cooled, the core or mold of this invention is easily disintegrated or shaken out by brushing, blowing, tumbling, pounding or flushing and the casting is ready for use or machining and finishing. The sand thus obtained from the used cores and molds may be reused, for many purposes, simply by remoistening and/or addition of a small amount of makeup binder solution. A large proportion of the binder remaining in the used sand can be removed by washing and the binder can be completely removed by burning and washing processes now in common use in the foundry industry for the reclaiming of sand.

The plasticity of a given wet sand-binder mix is determined by taking a handful of the mix and rolling it between the hands while observing the tendency of the roll to stay in one piece or to "ball up." The failure of the mix to show good cohesion or to "ball up" when subjected to the hand test indicates a poor degree of plasticity for the mix.

The degree of sticking of cores to the box must be low or negligible in order that costly delays involving cleaning and scraping of the boxes be avoided. The degree of sticking of the core to the box is determined by blowing ten successive sand cores in a previously cleaned box followed by the isolation and weighing of the residue left sticking to the box after the removal of the tenth core. The sand-binder compositions of this invention show extremely low sticking to the core box as evidenced by an almost complete lack of a residue on the core box walls in the foregoing test.

The water sensitivity of a given baked core is measured by placing a baked standard A.F.S. tensile core in a stream of water at 20° C. and determining the degree of stickiness, swelling and disintegration of the baked dumbbell. The compositions of the present invention are unusually water insensitive when compared to other baked sand-binder compositions.

The following examples are given in order to illustrate the products and processes of the present invention. The quantities of ingredients are given in parts by weight unless otherwise specified.

*Example I*

A solution of 231 parts of water and 0.049 part of potassium persulfate in a closed reactor is stirred and heated to about 90° C. To this stirred and heated solution is then added slowly over a period of an hour a mixture containing 65 parts of water, 36 parts of acrylic acid, 64 parts of acrylonitrile and 0.001 part of potassium persulfate. The heating and stirring is continued for another hour after completion of the addition of the monomer mixture and an emulsion of polymer in water results. The cooled emulsion is next treated with a neutralizing agent such as ammonia, hydrazine, monoethanol amine, methyl amine and the like to a pH of about 7 to yield a solution of the salt of the acrylonitrile-acrylic acid copolymer in water.

For the sand core and mold mixes a standard recipe of 0.25 part of polymeric binder, 2.5 parts total moisture and 100 parts of Ottowa No. 50 foundry sand was used. The pH of each of the sand-binder mixes as well as green compression strength, plasticity, baked tensile, water insensitivity and degree of sticking to the core box were determined with the following results. The acrylonitrile-acrylic acid copolymers described below were prepared by the above-described procedure.

| Polymeric Binder | pH | Green Compression Strength | Plasticity | Tensile, 30′ x 350° F., p.s.i. | Water Insensitivity | Degree of Sticking |
|---|---|---|---|---|---|---|
| 64/36 acrylonitrile-acrylic acid NH₄⁺ salt | 7.2 | 0.70 | Good | 203 | V. Good | V. Good. |
| 64/36 acrylonitrile-acrylic acid NH₄⁺ salt | 8.8 | 0.86 | V. Good | 172 | Good | V. Good. |
| 50/50 acrylonitrile-acrylic acid NH₄⁺ salt | 7.1 | 0.76 | Good | 180 | Poor | Poor. |
| Polyvinyl alcohol | 6.9 | 0.68 | Poor | 139 | Fair | Fair. |
| Polyacrylic acid NH₄⁺ salt | 7.3 | 0.90 | V. Good | 110 | Poor | Poor. |
| Carboxymethyl cellulose | | 1.35 | Fair | 50 | Poor | Poor. |
| 75/25 acrylic acid-vinyl acetate NH₄⁺ salt | 6.7 | 0.70 | Good | 203 | V. Good | Poor. |
| 75/25 acrylic acid-vinyl acetate NH₄⁺ salt | 8.8 | 0.04 | Poor | 200 | Good | Poor. |
| Sodium salt of hydrolyzed polyacrylonitrile in which about 25% of the nitrile groups are converted to amide and 75% of nitrile groups are converted to carboxyl groups. | 10.4 | 0.36 | Fair | 237 | V. Poor | Poor. |

*Example II*

A series of acrylonitrile-acrylic acid copolymers were prepared by the procedure given in Example I. The polymers were converted to their ammonium salts and were mixed with Ottowa No. 50 sand by the method of Example I to form sand-binder mixes having the following properties.

| Binder Composition | pH | Green Compression Strength | Plasticity | Water Sensitivity | Sticking |
|---|---|---|---|---|---|
| 50:50 acrylonitrile-acrylic acid | 6.6 | 0.60 | V. Good | Fair | Poor. |
| 68:32 acrylonitrile-acrylic acid | 7.8 | 0.50 | Good | Good | Good. |
| 77:23 acrylonitrile-acrylic acid | 7.8 | 0.61 | Good | Good | V. Good. |
| 88:15 acrylonitrile-acrylic acid | 7.8 | 0.55 | Poor | Poor | Poor. |

The monoethanol amine salts of the acrylonitrile-acrylic acid copolymers described above imparted comparable properties to sand cores.

*Example III*

A 31:69 copolymer of acrylic acid and acrylonitrile was prepared by stirring a solution of 616 parts of demineralized water containing 6 parts of potassium persulfate and maintaining it at a temperature of 90° C. in a closed reactor. Two solutions (A and B) are then simultaneously proportioned into the reactor. Solution A consists of a mixture of 300 parts of demineralized water and 7.5 parts of potassium persulfate. Solution B consists of a mixture of 72 parts of acrylic acid, 159 parts of acrylonitrile and 30 parts of monoethanol amine. Solution A is proportioned at such a rate that 120 minutes is required for its complete addition. Solution B is added uniformly over a period of 105 minutes. Upon completion of the addition of solutions A and B the reaction temperature is raised rapidly to 100° C. and is maintained at this temperature for 8 to 9 hours. The polymer solution is then allowed to cool to about 45° C. and the pH is adjusted to from 7 to 8 with monoethanolamine (30–32 parts) and the polymer solution is then cooled rapidly to room temperature. A sand core is prepared by the procedure set forth in Example I with the exception that an A.F.S. 50–70 standard sand is used. The baked core has a scratch hardness of 78, a green compression strength of 0.7, a tensile of 220 p.s.i., good water insensitivity and is very good in the sticking test. A 50:50 copolymer of acrylic acid and acrylonitrile prepared in the foregoing manner and neutralized with monoethanolamine gives a baked sand core having a tensile of 191 p.s.i., a scratch hardness of 70 and sticks badly in the core box. A 20:80 copolymer of acrylic acid and acrylonitrile formed a sand core having slightly lower tensile but otherwise comparable to the foregoing 31:69 copolymer.

I claim:

1. The sand core and mold composition suitable for use in casting metals comprising a mixture of from 97 to 99.85% by weight of sand and from 0.15 to 3% by weight of an interpolymer of from 60 to 80% by weight of acrylonitrile and from 20 to 40% by weight of acrylic acid, said interpolymer being neutralized with a member of the group consisting of ammonia, a water-soluble alkyl amine and an amino alkanol.

2. The sand core and mold composition suitable for use in casting metals comprising a mixture of from 97 to 99.85% by weight of sand and from 0.15 to 3% by weight of an ammonium salt of an interpolymer of from 60 to 80% by weight of acrylonitrile and from 20 to 40% by weight of acrylic acid.

3. The sand core and mold composition suitable for use in casting metals comprising a mixture of from 97 to 99.85% by weight of sand and from 0.15 to 3% by weight of a water-soluble alkyl amine salt of an interpolymer of from 60 to 80% by weight of acrylonitrile and from 20 to 40% by weight of acrylic acid.

4. The sand core and mold composition suitable for use in casting metals comprising a mixture of from 97 to 99.85% by weight of sand and from 0.15 to 3% by weight of the ammonium salt of an interpolymer of 64% by weight of acrylonitrile and 36% by weight of acrylic acid.

5. The sand core and mold composition suitable for use in casting metals comprising a mixture of from 97 to 99.85% by weight of sand and from 0.15 to 3% by weight of the monoethanol amine salt of an interpolymer of 69% by weight of acrylonitrile and 31% by weight of acrylic acid.

6. The sand core and mold composition suitable for use in casting metals comprising a mixture of from 97 to 99.85% by weight of sand and from 0.15 to 3% by weight of the ammonium salt of an interpolymer of 68% by weight of acrylonitrile and 32% by weight of acrylic acid.

7. The sand core and mold composition suitable for use in casting metals comprising a mixture of from 97 to 99.85% by weight of sand and from 0.15 to 3% by weight of the ammonium salt of an interpolymer of 77% by weight of acrylonitrile and 23% by weight of acrylic acid.

8. The sand core and mold composition suitable for use in casting metals comprising a mixture of from 97 to 99.85% by weight of sand and from 0.15 to 3% by weight of the amonium salt of an interpolymer of 69% by weight of acrylonitrile and 31% by weight of acrylic acid.

9. The sand core and mold composition suitable for use in casting metals comprising a mixture of from 97 to 99.85% by weight of sand and from 0.15 to 3% by weight of the monoethanol amine salt of an interpolymer of 64% by weight of acrylonitrile and 36% by weight of acrylic acid.

References Cited in the file of this patent

UNITED STATES PATENTS

| | | |
|---|---|---|
| 2,765,507 | Wolf et al. | Oct. 9, 1956 |
| 2,817,128 | Wickett | Dec. 24, 1957 |

FOREIGN PATENTS

| | | |
|---|---|---|
| 532,044 | Canada | Oct. 23, 1956 |